(12) United States Patent
Mihm

(10) Patent No.: US 10,000,177 B2
(45) Date of Patent: Jun. 19, 2018

(54) AIRBAG MODULE

(71) Applicant: TK Holdings Inc., Auburn Hills, MI (US)

(72) Inventor: Russell Joseph Mihm, Beverly Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days. days.

(21) Appl. No.: 15/080,094

(22) Filed: Mar. 24, 2016

(65) Prior Publication Data

US 2017/0274863 A1 Sep. 28, 2017

(51) Int. Cl.
*B60R 21/262* (2011.01)
*B60R 21/2346* (2011.01)
*B60R 21/231* (2011.01)
*B60R 21/237* (2006.01)
*B60R 21/232* (2011.01)
*B60R 21/261* (2011.01)
*B60R 21/233* (2006.01)
*B60R 21/207* (2006.01)

(52) U.S. Cl.
CPC ...... *B60R 21/23138* (2013.01); *B60R 21/232* (2013.01); *B60R 21/237* (2013.01); *B60R 21/2346* (2013.01); *B60R 21/261* (2013.01); *B60R 21/262* (2013.01); *B60R 21/207* (2013.01); *B60R 21/233* (2013.01); *B60R 2021/23123* (2013.01); *B60R 2021/23146* (2013.01); *B60R 2021/2612* (2013.01)

(58) Field of Classification Search
CPC ................ B60R 21/261; B60R 21/262; B60R 21/23138; B60R 21/2346; B60R 21/233; B60R 21/207; B60R 21/26; B60R 2021/23146; B60R 2021/2612; B60R 2021/2615; B60R 2021/2617; B60R 2021/23123; B60R 2021/23566
USPC .............................. 280/740, 736, 742, 730.2
See application file for complete search history.

(56) References Cited

U.S. PATENT DOCUMENTS

| 8,540,278 | B2 | 9/2013 | Chavez et al. |
| 2010/0140906 | A1* | 6/2010 | Honda .............. B60R 21/23138 |
| | | | 280/730.2 |
| 2010/0164209 | A1* | 7/2010 | Magnin ................. B60R 21/232 |
| | | | 280/740 |
| 2014/0103625 | A1 | 4/2014 | Thomas et al. |

* cited by examiner

*Primary Examiner* — Keith Frisby
(74) *Attorney, Agent, or Firm* — Gordon Rees Scully Mansukhani, LLP

(57) ABSTRACT

An airbag module for protecting an occupant of a vehicle. The module includes an airbag and an inflator for providing inflation gas for the airbag. A diffuser is positioned in the airbag and configured to direct the flow of inflation gas into the airbag. The diffuser includes a main panel and a deflector panel connected together. The diffuser is configured to provide for first and second flow paths for inflation gas to exit diffuser and flow into the cushion. The main panel is folded along a fold line to create two folded portions and the deflector panel is located within the connected folded portions. The deflector panel is located in the first flow path and extends beyond the folded portions of the main panel. The extending portion of the deflector panel forces the inflation gas to change direction.

9 Claims, 6 Drawing Sheets

AIRBAG MODULE

BACKGROUND

Airbag modules generally include a stored airbag or cushion and an inflator. The modules may be located in a position to deploy into the passenger compartment of a vehicle in order to protect the occupant during a crash event. The airbag may include various inflatable chambers to ensure that the airbag provides appropriate cushioning, ejection mitigation, energy absorption, and other desirable protective features. The airbag may also include an internal diffuser to direct gas to desired region of the airbag. The present application is directed to an airbag module that includes an improved diffuser configuration.

SUMMARY

According to a disclosed embodiment an airbag module is configured to include an airbag and an inflator. A diffuser may be a diffuser positioned in the airbag and configured to direct the flow of inflation gas into the airbag. The diffuser may be constructed from a main panel and a deflector panel connected together. The deflector panel is configured to overlie the main panel. The main panel may be folded along a fold line resulting in two symmetrical portions of the main panel separated by the fold line. The two symmetrical portions are connected together and to the deflector panel so that the deflector panel is located within the connected symmetrical portions. An extending portion of the deflector panel extends beyond the folded main panel.

As described further herein, an airbag module for protecting an occupant of a vehicle may include an airbag including a diffuser and an inflator for providing inflation gas for the airbag. The diffuser may be configured to provide first and second flow paths for inflation gas to exit diffuser and flow into the airbag. The diffuser includes a main panel and a deflector panel connected together. The main panel is folded along a fold line to create two folded portions and the deflector panel is located within the connected folded portions. The deflector panel is located in the first flow path and extends beyond the folded portions of the main panel, and wherein the extending portion of the deflector panel forces the inflation gas to change direction.

An airbag for protecting an occupant of a vehicle is disclosed herein. The airbag may include an inflatable chamber and a diffuser positioned to control the direction of inflation gas entering the inflatable chamber. The diffuser may include a main panel and a deflector panel connected together. The main panel is folded along a fold line to create two folded portions and the deflector panel is located within the connected folded portions. The folded main panel creates first and second flow paths for inflation gas to exit the diffuser and flow into the cushion. The airbag is configured so that inflation gas traveling along the first flow path exits the folded main panel in a direction substantially orthogonal to the direction of inflation gas exiting the folded main panel along the second flow path. The deflector panel is located in the first flow path and extends beyond the folded main panel to thereby force the inflation gas traveling the first flow path to change direction.

It is to be understood that both the foregoing general description and the following detailed description are exemplary and explanatory only, and are not restrictive of the invention as claimed.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

Various features of the present invention will be described with reference to the drawings. Like numbers are used throughout the drawings to refer to the same or similar parts and in each of the embodiments of the invention hereafter described.

Airbags may include diffusers for directing gas and shielding panels from hot inflation gas. A CSIAB (center side airbag) module may employ an internal fabric diffuser that is installed inside a sealed cushion with the intention that it shall both shield the cushion's main panels from excessive heat due to the deploying inflator and provide a mechanism of directing gas to desired regions of the cushion. The inflator is installed inside of the fabric diffuser with its nozzles aligned in such a way that the diffuser provides heat shielding without being burned-through. The diffuser may also employ vents (holes, openings, etc.) that allow inflator gases to escape out into the cushion chambering.

Figure 14:
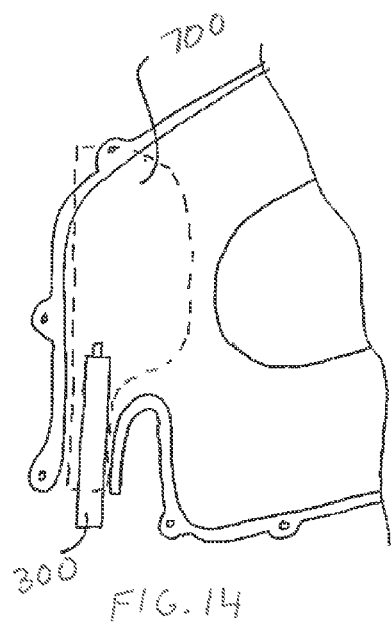
FIG. 14 is an illustration of a diffuser overlying a side airbag in order to show the overlap of the perimeter of the airbag panel and the diffuser.
Figure 15:
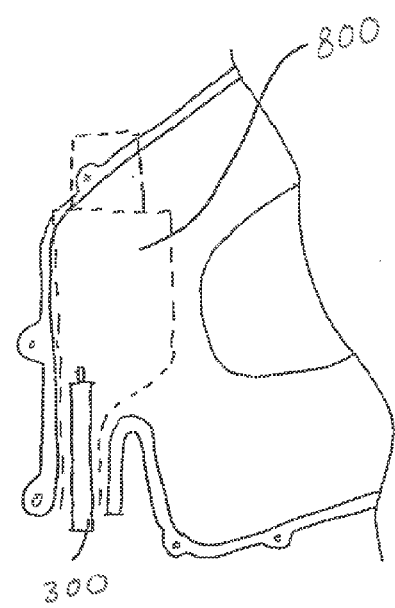
FIG. 15 is an illustration of a diffuser overlying a side airbag in order to show the overlap of the perimeter of the airbag panel and the diffuser.
Figure 16:
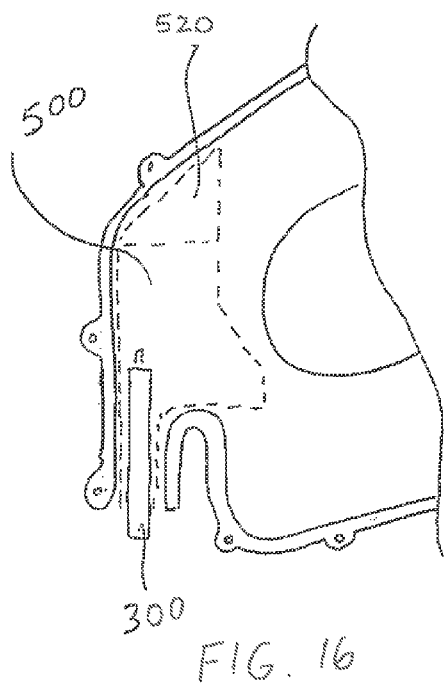
FIG. 16 is an illustration of a diffuser overlying a side airbag in order to show how the diffuser fits within the confines of the airbag.

These holes can be tuned or adjusted by, for example, increasing or decreasing hole size, to further control the direction and flow of the inflation gases during deployment of the airbag. The fabric diffuser may include a sewn or closed off end at the upper portion of the diffuser to function as a pocket or parachute to catch the inflation gas in order to keep the diffuser in position during deployment. The fabric diffuser may present challenges when installed into an airbag or cushion. The sewing of multiple layers of fabric and certain diffuser configurations may not fit or install well inside of a cushion and, as a result, the diffuser may bunch up or be difficult to fold thereby possibly creating issues with the size and appearance of the folded cushion. For example, as shown in FIGS. 14 and 15, the diffusers 700, 800 do not fit well within the perimeter of the panels that are sewn together to form the side airbag. Prior to assembly of the airbag, there is overlap at the upper end of the diffusers 700, 800 and the perimeter of the side airbag. Thus, there is a risk of bunching that can occur during manufacturing. On the other hand, as described herein, the diffuser 500 shown in FIG. 16 can be adjusted so that the deflector panel 520 is positioned within the cushion chamber. The diffuser 500 eliminates the overlap that is shown in FIGS. 14 and 15. The diffuser may be easily modified by changing the angle of the deflector panel and/or the size and position of the lower opening to match the cushion chamber arrangement. Also, as described further below the deflector panel 520 does not include sewing outside of the diffuser thereby avoiding seams that can make the fabric more rigid and more difficult to fold and manipulate.

The various diffusers disclosed herein overcome any issues of poor packagability through the use of a deflector panel that may be sewn inside of the surrounding diffuser heat shield panels with a cross-sew. The outer diffuser panels may be configured so that the panels do not overlap with the cushion foldover point. The thin flexible deflector panel may protrude from the main diffuser body to form a gas guiding mechanism that may be tuned by adjusting the angle of the panel foldover line as well as the forward/rearward opening.

The upper portion of the diffuser is minimal (i.e., relatively thin) in its design. Thus, there is no rigid—sewn seam to fold over while folding the cushion, greatly improving the ability for the cushion to be folded without negatively affecting size of the folded airbag (e.g., in the cross-car direction for a CSIAB). The deflector panel does not require a separate sewn seam and is only two fabric layers thick. The deflector panel may be sized to fit exactly within a given cushion geometry without interference and without negatively affecting diffuser integrity due to decreased diffuser volume that may result in increased pressure in the diffuser.

Because of the arrangement of the outer diffuser panels relative to the inner deflector panel, a slit may be formed down the rear edge of the deflector panel that can be tuned as an additional exhaust vent to prevent diffuser over-pressurization or as another gas escape path to control cushion fill characteristics. The tunable slit vent prevents any diffuser telescoping (i.e. a downward shifting of the diffuser causing nozzle exposure and subsequent heat exposure to the cushion main panel). The slit vent may be adjusted to intentionally provide for slight telescoping of the outer diffuser panels in order to expose the slit in certain scenarios when excess pressure is reached inside the diffuser. The disclosed diffuser provides for excess pressure to be relieved and, as a result, the overall size and volume of the diffuser volume may be reduced to fit more compact cushion chamber designs without any concern of failure of the diffuser due to overpressurization.

Also, the diffuser may include internal heat shields positioned relative to the deflector panel to protect the diffuser from burn-through while allowing gas to exit through the slit. The diffuser may include either a seam vent or punch vent, depending on desired fill characteristics.

The disclosed diffuser is an improved design because the upper portion of the diffuser (i.e., the deflector panel) is more flexible because of the lack of seams and a minimal number of fabric layers. The diffuser can be folded much easier and provides for improved packaging. The deflector panel may fit into very tight chamber environment of an airbag or cushion due to angled profile of the folded panel. The one piece deflector panel both controls gas direction and gas flow in an improved manner because existing designs require a more rigid diffuser in order to ensure that the diffuser remains upright. Also, the one-piece deflector panel allows gas to be vented through a tunable slit at the rear of the diffuser.

The application is directed to airbag modules for use in vehicles. According to an embodiment shown in FIG. 1, a center side airbag module is disclosed. The airbag module includes an airbag or cushion 100 that includes a first chamber 110 and a second chamber 120. The second chamber 120 is located to provide protection for the head of a vehicle occupant positioned in a vehicle seat 10. The airbag may include one or more non-inflatable regions 130. Also, the bag may include various internal seams 140 that function to separate the airbag 100 into two or more internal chambers. The seams may include circular shaped end portions to assist in distributing the stress more evenly along the seam. As shown in FIG. 2, the airbag module includes an inflator 300 for providing inflation gas for the cushion.

The airbag 100 is configured to deploy into a position between the occupant and the vehicle center console 20. However, in certain vehicle arrangements, the airbag 100 may be configured different to accommodate the structural configuration present in a vehicle that does not include a center console. For example, the airbag 100 may extend further below the seat bottom and use the seat bottom of the passenger and/or driver seats to provide support for the airbag in the absence of a center console.

Figure 1:
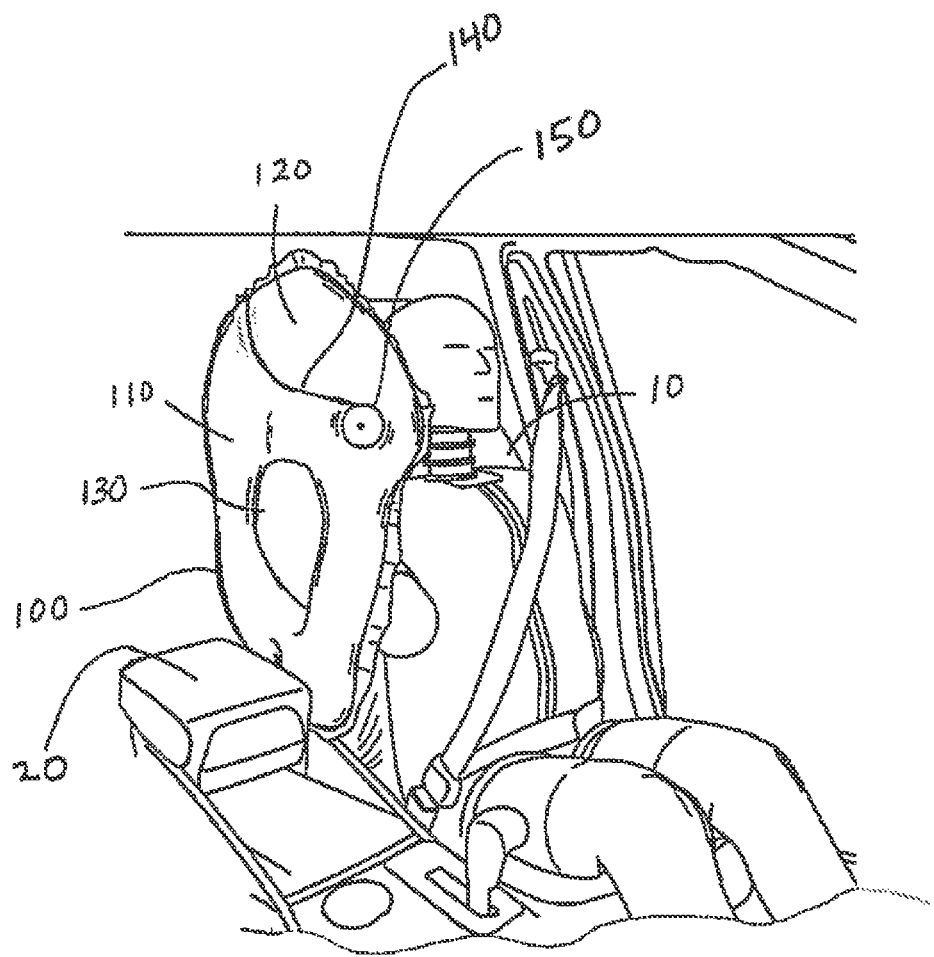
FIG. 1 is a schematic view of a deployed center side airbag.
Figure 2:
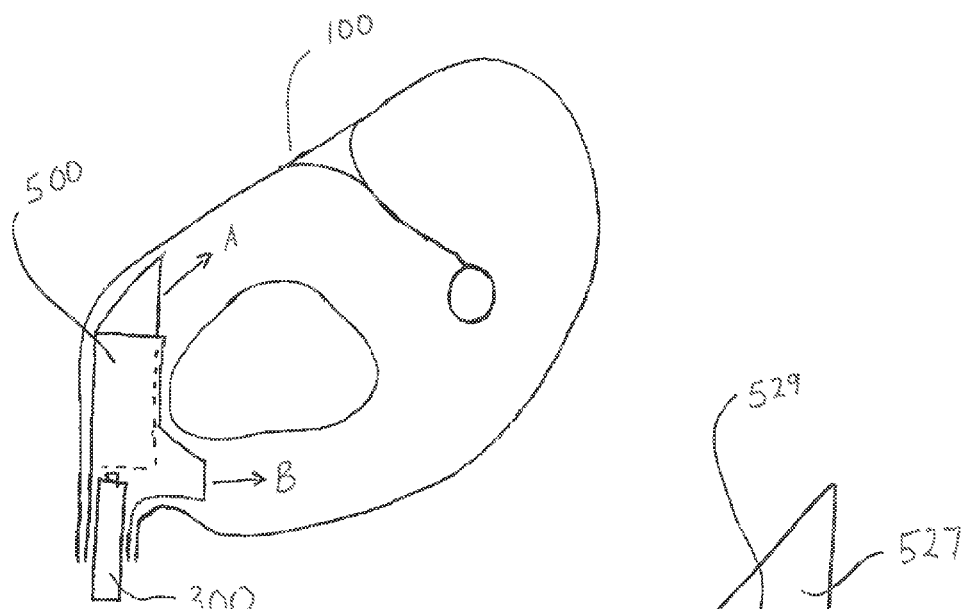
FIG. 2 illustrates an airbag including a diffuser.

Although FIG. 1 discloses a center side airbag, the diffuser structures disclosed herein is applicable to other airbag configurations such as a side curtain type airbag, or a side airbag mounted to the outboard side of the vehicle seat.

The airbag 100 described herein is preferably formed of two main panels. The panels may be referred to as inboard and outboard panels. The panels may be connected along together along a perimeter seam. The panels may also be connected at various internal seams, such as an upper seam 140 dividing the first chamber 110 from the second chamber 120. In addition, a closed seam may be provided in the first chamber 110 to provide a non-inflatable region. A non-inflatable region may be used to reduce the overall airbag volume in order to reduce the amount of gas needed to be provided by the inflator 300.

Figure 3:
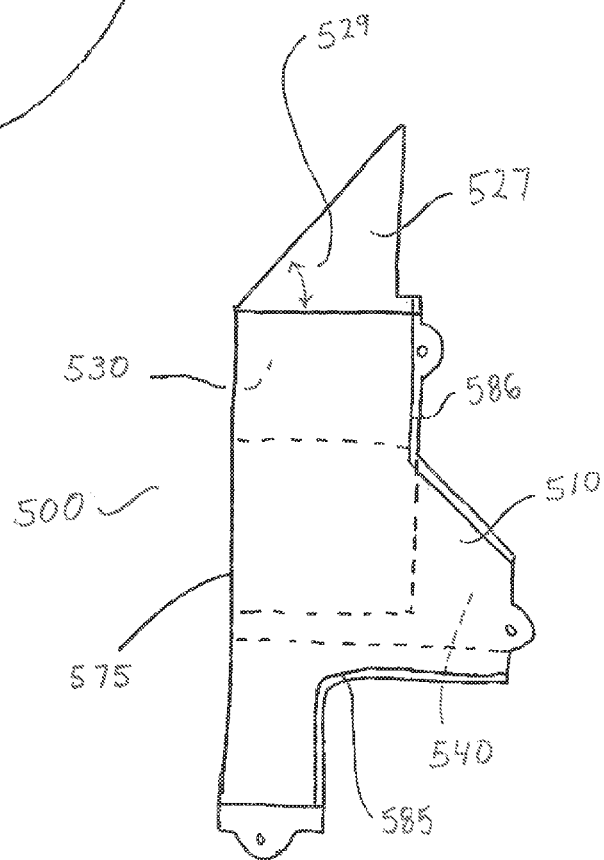
FIG. 3 illustrates the airbag diffuser of FIG. 2.
Figure 4:
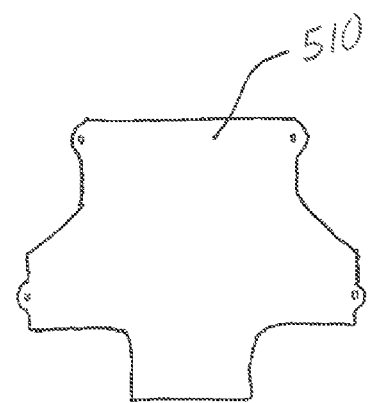
FIG. 4 is a plan view of a fabric panel used in the diffuser of FIG. 3.
Figure 5:
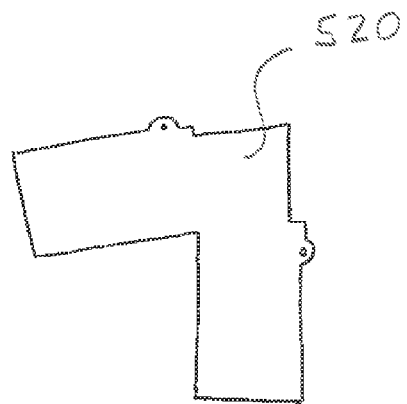
FIG. 5 is a plan view of a fabric panel used in the diffuser of FIG. 3.
Figure 6:
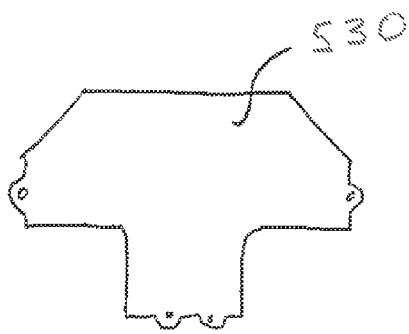
FIG. 6 is a plan view of a fabric panel used in the diffuser of FIG. 3.
Figure 7:
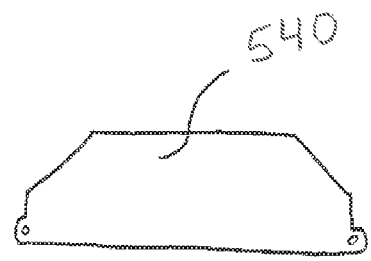
FIG. 7 is a plan view of a fabric panel used in the diffuser of FIG. 3.
Figure 8:
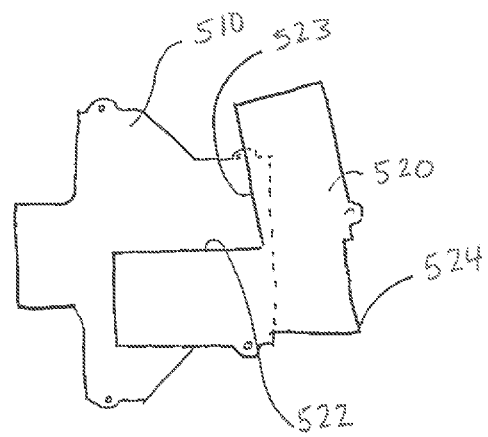
FIG. 8 is a plan view of the fabric panels of FIGS. 4 and 5 during the construction of the diffuser of FIG. 3.

As shown in FIG. 2, the airbag may also include a diffuser 500. The diffuser may direct the flow of inflation gas into the airbag. For example, the diffuser 500 may include two main openings that direct the gas flow in directions A and B shown in FIG. 2. As shown in FIG. 3, the diffuser may be formed by several separate panels that are arranged together. The diffuser includes a main panel 510 that is folded to form the gas flow openings into the cushion. At the upper end of the diffuser, a deflector panel 520 is placed between the folded sides of the main panel 510. As shown in the FIG. 3, the deflector panel 520 creates an angled surface for redirecting the gas into the airbag.

Figure 9:
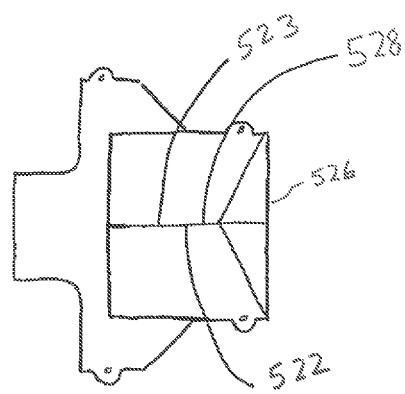
FIG. 9 is a plan view of the fabric panels of FIGS. 4 and 5 during the construction of the diffuser of FIG. 3.
Figure 10:
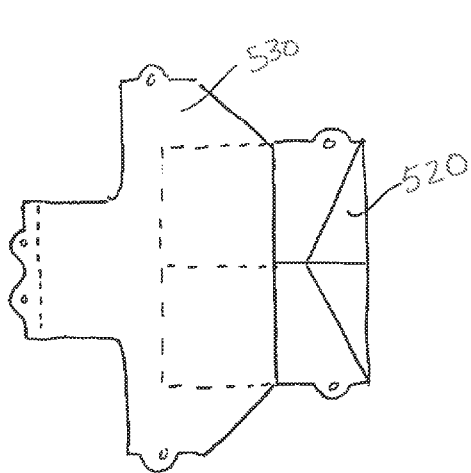
FIG. 10 is a plan view of the fabric panels of FIGS. 4-6 during the construction of the diffuser of FIG. 3.

The diffuser may also include additional panels for improved construction and operation. For example, the diffuser 500 may include an inner panel 530 that is located on the opposite side of the deflector panel 520 from the diffuser main panel 510. Thus, the inner panel 530 functions to hold the deflector panel 520 in position and strengthen the overall diffuser 500. The diffuser may also include a panel 540 that functions as a heat shield or heat patch 540. The heat shield 540 is located adjacent to the gas outflow opening from the inflator 300 to protect the integrity of the diffuser 500 from the heated inflation gas. The material for the diffuser and airbag panels may be a suitable fabric such as, for example, natural or synthetic material formed from carbon fibers, polymeric fibers, or composite fibers. The panels may be woven or nonwoven fabric. The seams described herein may be sewn or be any other suitable bonding material or mechanism such as a sealant material or thermobonding, for example, FIGS. 8-11 show the assembly of the diffuser 500. In a first step, the deflector panel 520 is placed on top of the main panel 510. The deflector panel 520 is folded (preferably without any sewing), as shown in FIG. 9. The internal edges 522, 523 of the deflector panel are placed adjacent to one another, and the pointed end 524 is folded over along a fold line 526. In the next step, the inner panel 530 is placed on top of the deflector panel 520 and the main panel 510. In another assembly step, the heat shield 540 is placed on top of the inner panel 530 and all of the panels are connected together along a cross seam 565. Finally, the panels are folded along a fold line 575, as shown in FIG. 3. Perimeter seams 585, 586 are employed to hold the folded panels together to form the final diffuser arrangement. As shown in FIGS. 3 and 8-11, the panels are folded in symmetrical fashion so that after the folding, two symmetrical portions of the panel are formed with an extending portion 527 of the deflector panel 520 protruding from the main portion of the diffuser 500.

As described above, the deflector panel 520 may be adjusted or tuned to provide for desired performance based on the airbag and inflator configuration. The angle 529 of the ramp section or extending portion 527 of the diffuser 500 formed by the deflector panel 520 may be adjusted by varying the shape of the diffuser portion. The ramp section 527, which may form a generally concave shape when directing the flow of inflation gas, causes the inflation gas to change direction as the gas flows into the airbag. As can be seen in FIGS. 8-11, there is no need to place a threaded seam (or any other seam) in the ramp portion of the deflector panel, which allows for a more compact arrangement of the diffuser 500. As a result of the relative thin profile, the diffuser 500 (and, in particular the deflector panel 520) does not have a tendency to bunch up or become misaligned when packaged within the folded airbag. In addition, the size of the heat patch 540, may be adjusted as necessary to provide for proper protection of the diffuser material.

Figure 11:
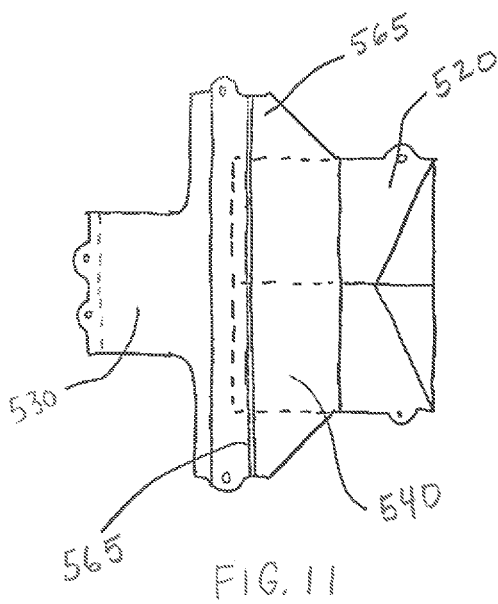
FIG. 11 is a plan view of the fabric panels of FIGS. 4-7 during the construction of the diffuser of FIG. 3.
Figure 13:
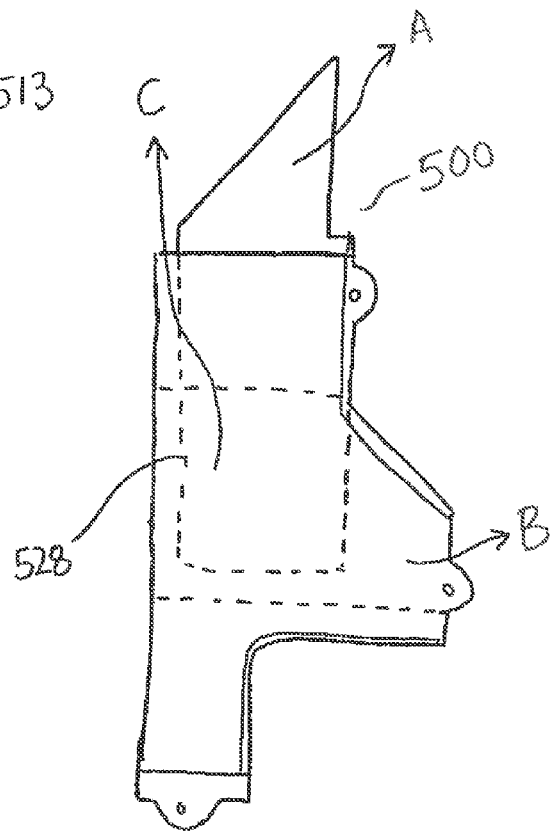
FIG. 13 illustrates an alternative embodiment of an airbag diffuser.

As described above, and shown in FIG. 13, the opening or slit 528 in the deflector panel 520 is formed by the unconnected edges 522, 523 and provides another flow path C for gas to enter the airbag. This flow path C may be used to relieve pressure in the diffuser when inflation gas builds up due to flow resistance through the two main flow paths A, B shown in FIG. 2. As mentioned above, the size of the heat panel or patch 540 and inner panel 530 may be adjusted. As shown in FIG. 11, these two inner most panels 530, 540 cover a portion of the slit 528 in the deflector panel 520. By adjusting the size of one or both of these inner panels 530, 540 the amount of gas escaping through the split may be adjusted in order to tune or configure the airbag for desired deployment. Although not shown in the figures, the design of the slit 528 may be adjusted to allow gas to escape in a direction that may be generally, downward and/or lateral as depicted in FIG. 13. For example, a seam may be added to specifically close a portion of the slit 528 and cause the gas to be directed in the desired direction.

Figure 12:
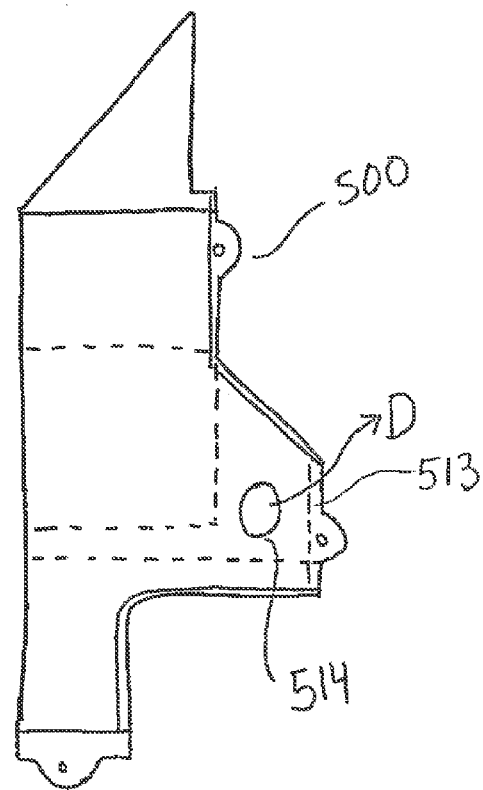
FIG. 12 illustrates an alternative embodiment of an airbag diffuser.

In addition, the diffuser 500 may include a flow path D through an optional vent opening 514 in the main panel 510. The size and shape of the vent opening 514 may be adjusted to provide for the designed inflation characteristics of the airbag. For ease of construction and manufacturing the opening 514 is positioned in one or more areas of the main panel 510 that does not include any overlap with another panel forming the diffuser 500. However, in an alternative embodiment, vent openings may be positioned in multiple overlying panels in an aligned relationship to thereby allow gas to flow through the layered panel structure of the diffuser. As shown in FIG. 12, the flow path B (shown in FIG. 2) may be blocked by a seam 513 so that gas vents into airbag through the vent opening 514.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the airbag and diffuser shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for protecting an occupant of a vehicle comprising:
   an airbag;
   an inflator for providing inflation gas for the airbag; and
   a diffuser positioned in the airbag and configured to direct the flow of inflation gas into the airbag, wherein
      the diffuser includes a main panel and a deflector panel connected together;
      the deflector panel overlies the main panel and the main panel is folded along a fold line and two symmetrical portions of the main panel are separated by the fold line;
      the two symmetrical portions are connected together and to the deflector panel so that the deflector panel is located within the connected symmetrical portions;
      an extending portion of the deflector panel extends beyond the folded main panel; and
   wherein the deflector panel is folded along the fold line thereby dividing the deflector panel into two symmetrical portions; and
   wherein the symmetrical portions of the deflector panel include unconnected edges extending along the fold line so that the unconnected edges provide an opening for gas to exit the diffuser into the cushion.

2. The airbag module of claim 1, wherein the main panel includes an opening located along the fold line so that inflation gas can exit the diffuser through the opening.

3. The airbag module of claim 1, wherein the extending portion of the deflector panel does not include any seams.

4. The airbag module of claim 1, wherein the diffuser includes a second flow path for inflation gas to exit the diffuser and flow into the cushion without being deflected by the deflector panel or passing through the opening.

5. An airbag module for protecting an occupant of a vehicle comprising:
   an airbag cushion;
   an inflator for providing inflation gas for the cushion; and
   a diffuser positioned in the airbag and configured to direct the flow of inflation gas into the airbag, wherein
      the diffuser is configured to provide first and second flow paths for inflation gas to exit the diffuser and flow into the cushion;
      the diffuser includes a main panel and a deflector panel connected together;
      the main panel is folded along a fold line to create two folded portions and the deflector panel is located within the connected folded portions;
      the deflector panel is located in the first flow path and includes a portion that extends beyond the folded portions of the main panel; and
      the extending portion of the deflector panel forces the inflation gas from the inflator exiting the diffuser to change direction; and
   wherein the second flow path is configured to allow inflation gas to exit the diffuser in a direction different than the direction of gas exiting the diffuser by way of the deflector panel;
   wherein the diffuser includes a third flow path for inflation gas to exit the diffuser into the cushion; and
   wherein the main panel includes an opening in at least one of the folded portions to thereby provide for the third flow path for inflation gas exiting the diffuser.

6. The airbag module of claim 5, wherein the inflation gas traveling along the first flow path exits the folded main panel in a direction substantially orthogonal to the direction of inflation gas exiting the folded main panel along the second flow path.

7. The airbag module of claim 5, wherein the deflector panel is folded along the fold line thereby dividing the deflector panel into two symmetrical portions.

8. The airbag module of claim 5, wherein the extending portion of the deflector panel is configured to form into a concave surface when inflation gas is passing through the diffuser into the cushion.

9. An airbag for protecting an occupant of a vehicle comprising:
   an inflatable chamber; and
   a diffuser positioned to control the direction of inflation gas entering the inflatable chamber, wherein
      the diffuser includes a main panel and a deflector panel connected together;
      the main panel is folded along a fold line to create two folded portions and the deflector panel is located within the connected folded portions;
      the folded main panel creates first and second flow paths for inflation gas to exit the diffuser and flow into the cushion;
      the inflation gas traveling along the first flow path exits the folded main panel in a direction substantially orthogonal to the direction of inflation gas exiting the folded main panel along the second flow path; and
      the deflector panel is located in the first flow path and extends beyond the folded main panel to thereby force the inflation gas traveling the first flow path to change direction; and
   wherein the main panel includes an opening located along the fold line to thereby provide a third flow path for gas to exit the diffuser.

* * * * *